United States Patent
Aliabadi et al.

(10) Patent No.: US 7,373,314 B2
(45) Date of Patent: May 13, 2008

(54) UNIFIED PRODUCT PURCHASING METHOD

(75) Inventors: Amir Aliabadi, Issaquah, WA (US); Kelvin Moeller, Paradise Valley, AZ (US); Scott Sovine, Chandler, AZ (US); Kenny W. Thomason, Tempe, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 462 days.

(21) Appl. No.: 09/882,368

(22) Filed: Jun. 15, 2001

(65) Prior Publication Data

US 2002/0065737 A1    May 30, 2002

Related U.S. Application Data

(60) Provisional application No. 60/212,103, filed on Jun. 15, 2000.

(51) Int. Cl.
*G06Q 30/00* (2006.01)
(52) U.S. Cl. .......................................... 705/26; 705/27
(58) Field of Classification Search ............ 705/26–27, 705/25
See application file for complete search history.

(56) References Cited

U.S. PATENT DOCUMENTS

| | | |
|---|---|---|
| 5,537,586 A | 7/1996 | Amram et al. |
| 5,710,884 A | 1/1998 | Dedrick |
| 5,754,981 A | 5/1998 | Veeneman et al. |
| 5,774,874 A | 6/1998 | Veeneman et al. |
| 5,799,157 A | 8/1998 | Escallon |
| 5,862,223 A | 1/1999 | Walker et al. |
| 5,878,141 A | 3/1999 | Daly et al. |

(Continued)

FOREIGN PATENT DOCUMENTS

WO    WO 98/04976    2/1998

(Continued)

OTHER PUBLICATIONS

ISyndicate and InfoSpace Team to Broadly Deliver Consumer Services, PR Newswire, New York, Mar. 20, 2000.*

(Continued)

*Primary Examiner*—Matthew S. Gart
(74) *Attorney, Agent, or Firm*—Snell & Wilmer L.L.P.

(57) ABSTRACT

The present invention is directed to providing a method, apparatus and system for a unified product purchasing service and order injection system. More specifically, the present invention is directed to providing a shopping service that obtains products for a consumer across many different merchant and supplier sites while maintaining a consistent user interface for the consumer no matter which merchant provides the products. In particular, the present invention allows a consumer to search for, compare prices and order products from many different merchants located on the Internet. The consumer completes their shopping on the shopping site provided by the present invention and is not directed to another merchant's site to complete an order.

13 Claims, 14 Drawing Sheets

U.S. PATENT DOCUMENTS

| | | | |
|---|---|---|---|
| 5,960,411 A | 9/1999 | Hartman et al. | |
| 5,966,697 A | 10/1999 | Fergerson et al. | |
| 5,970,474 A | 10/1999 | LeRoy et al. | |
| 5,987,440 A | 11/1999 | O'Neil et al. | |
| 6,023,683 A | 2/2000 | Johnson et al. | |
| 6,029,141 A | 2/2000 | Bezos et al. | |
| 6,055,516 A | 4/2000 | Johnson et al. | |
| 6,101,482 A * | 8/2000 | DiAngelo et al. | 705/26 |
| 6,125,353 A * | 9/2000 | Yagasaki | 705/27 |
| 6,182,127 B1 | 1/2001 | Cronin, III et al. | |
| 6,192,380 B1 | 2/2001 | Light et al. | |
| 6,199,079 B1 | 3/2001 | Gupta et al. | |
| 6,256,623 B1 | 7/2001 | Jones | |
| 6,320,952 B1 | 11/2001 | Bruno et al. | |
| 6,327,598 B1 | 12/2001 | Kelley et al. | |
| 6,334,114 B1 | 12/2001 | Jacobs et al. | |
| 6,345,278 B1 | 2/2002 | Hitchcock et al. | |
| 6,490,602 B1 | 12/2002 | Kraemer | |
| 6,496,855 B1 | 12/2002 | Hunt et al. | |
| 6,499,042 B1 | 12/2002 | Markus | |
| 6,499,052 B1 | 12/2002 | Hoang et al. | |
| 6,505,172 B1 | 1/2003 | Johnson et al. | |
| 6,510,459 B2 | 1/2003 | Cronin, III et al. | |
| 6,535,880 B1 | 3/2003 | Musgrove et al. | |
| 6,578,011 B1 | 6/2003 | Forward | |
| 6,594,644 B1 | 7/2003 | Van Dusen | |
| 6,629,135 B1 | 9/2003 | Ross, Jr. et al. | |
| 6,643,624 B2 | 11/2003 | Philippe et al. | |
| 6,725,222 B1 * | 4/2004 | Musgrove et al. | 707/10 |
| 6,772,139 B1 | 8/2004 | Smith, III | |
| 6,856,963 B1 | 2/2005 | Hurwitz | |
| 6,892,185 B1 | 5/2005 | Van Etten et al. | |
| 6,895,388 B1 * | 5/2005 | Smith | 705/26 |
| 7,047,211 B1 | 5/2006 | Van Etten et al. | |
| 7,058,598 B1 | 6/2006 | Chen et al. | |
| 7,185,069 B2 | 2/2007 | Costin et al. | |
| 2001/0011250 A1 | 8/2001 | Paltenghe et al. | |
| 2002/0002496 A1* | 1/2002 | Miller et al. | 705/26 |
| 2002/0174018 A1 | 11/2002 | Bunger et al. | |
| 2002/0194125 A1 | 12/2002 | Shimada | |

FOREIGN PATENT DOCUMENTS

| | | |
|---|---|---|
| WO | WO 00/31657 | 6/2000 |

OTHER PUBLICATIONS

US 6,047,266, Apr. 2000, Bartoli et al. (withdrawn).
Lemay, Laura; Java 1.1: Interactive Course, 1997, The Waite Group.
Cozzens, Lisa; JavaScript Tutorial, http://www.cs.brown.edu/courses/bridge/1998/res/javascript-tutorial.html, 1998.
Printout of Website for About eWallet, http://www.ewallet.com, Jan. 11, 1999, 4 pages.
Printout of Website for Transactor Networks (CitiWallet), http://www.transactor.net.com, Jan. 11, 1999, 4 pages.
Bowen, Barry D., "How popular sites use cookie technology," Netscape Enterprise Developer, Apr. 1997.
Sirbu, Marvin, et al., "NetBill: An Internet Commerce System Optimized for Network-Delivered Services," IEEE Personal Communications, 34-39, Aug. 1995.
Unknown: "Gator offers one-click shopping at over 5,000 e-commerce sites today," Internet Publication, origin unknown, Jan. 14, 1999.
Unknown: "E-Commerce Leaders Announce Universal Formats for Simplified Online Payments," Internet Publication, origin unknown, Jun. 14, 1999.
Cingil, "Supporting Global User Profiles Through Trusted Authorities," Data Management Issues in Electronic Commerce, vol. 31, issue 1, Mar. 200, pp. 11-17.
Anonymous, "CDW Computer Centers: CDW Computer Centers Takes Online Shopping to the Next Level," Business Wire, May 18, 1998.
Bonisteel, S., "Company Sees One Shoping 'Basket' for Entire Web Oct. 28, 1999," Newsbytes, Oct. 28, 1999.
ANONYMOUS, "BuyerZone.com Announces Most Advanced eCommerce System for Small to Mid-Sized Businesses," Business Wire, Dec. 13, 1999.
alexa.com screen captures via the WayBackMachine (archieve.org) and dated Feb. 29, 2000.
"SmartShop.com Simplifies the Online Shopping Experience; New Site Promises to Redefine Internet Shopping," Business Editors; Business Wire; Nov. 29, 1999.

* cited by examiner

UNIFIED PRODUCT PURCHASING METHOD

CROSS-REFERENCE TO RELATED APPLICATION

This application claims the benefit of U.S. Provisional Application No. 60/212,103, filed Jun. 15, 2000, the benefit of which is hereby claimed under 35 U.S.C. § 119. The entire disclosure of the prior application is considered as being part of the disclosure of this application and is hereby incorporated by reference herein.

FIELD OF THE INVENTION

The present invention relates to electronic commerce, and more specifically, to a method and system for providing an aggregated interface for purchasing products and/or services from disparate merchants.

BACKGROUND OF THE INVENTION

Over the last several years, the Internet has seen expansive growth in the area of electronic commerce ("e-commerce"). Today, many consumers shop over the Internet from electronic retailers ("merchants") in the privacy of their home instead of shopping from catalogs or physically going to a store. While a consumer may not be able to physically handle the products while shopping on the Internet, the consumer may be able to view pictures of the products, have textual, graphical and audio descriptions of the products, as well as read reviews of the products. For example, a merchant may create an e-commerce site on the World Wide Web (the "Web" or "WWW") that is devoted to products carried in a physical store. This product information is typically made accessible to a consumer over the Internet through Web pages created by the merchant. A problem with this approach is that consumers have to learn how to navigate through all of the different e-commerce sites where they are interested in shopping. It would therefore be desirable to have an e-commerce site where the consumer navigates in the same manner whether shopping from Merchant A or Merchant B.

Typically, merchants provide the consumer with a search engine to find products on their Web site. While this makes navigation somewhat easier than the consumer manually navigating through each Web page, there are still problems. For example, each merchant may use a different search engine having different input requirements and/or the merchant may return matches to the search made by the consumer in a different manner. What is needed is a consistent manner of inputting and returning matches to the consumer.

If the consumer locates a product in which he or she is interested, the consumer is typically allowed to purchase the product(s) at that time. For example, if the consumer is interested in purchasing Product A from the merchant, the consumer will provide appropriate information to the merchant over a secure connection in order to process the order. This information typically includes name, shipping address, billing address, payment information and desired shipping method. This information is typically entered through an input form on a Web page designed and provided by the merchant. It is also common for the merchant to require the consumer to create an account on the merchant's site before purchasing products. If a consumer purchases items from many different sites he or she will have to keep track of many different accounts. It is desirable, therefore, to have a shopping site that enables a consumer to order products from many different merchants without requiring the consumer to keep track of all the different accounts required to purchase goods from the many different merchants.

Another e-commerce problem is that it is becoming harder for a consumer to locate products and comparison shop over the Internet. This is due to the sheer volume of merchants, products and services available to the consumer over the Internet. Today, a consumer may also use one of the commonly available search engines on the Internet to locate products. However, search engines generally return so many matches to a query that it is unrealistic for a consumer to manually inquire on each returned match. In addition, these matches also include both merchant and non-merchant Web sites making it even more difficult for a consumer to actually review all of the returned merchant sites. Further, either the Web shopping sites direct the consumer to another merchant Web site, or they place the merchant's Web site within a frame on one of their main pages. However, this approach does not provide the consumer with a consistent look and feel.

In an attempt to solve the above-mentioned problems of comparison shopping and locating products on the Internet, many different methods have been created that provide the consumer with access to many different merchant sites through one central site. For example, U.S. Pat. No. 5,895,454 to Harrington purports to describe a shopping system allowing the consumer to connect to remote Web sites whereupon the consumer interacts with the remote merchant Web site using the commands and structure hierarchy as originally established by the merchant. As the consumer navigates through the remote merchant's Web site, the consumer may return to the database interface to launch into a different remote merchant Web site. The problem with this approach is that the consumer still has to learn how to navigate and place orders through many different merchants. For example, if a consumer desires to purchase a product from Merchant A and Merchant B, the consumer will have to navigate each merchant's site. Today, either the Web shopping sites direct the consumer to another merchant Web site, or they place the merchant's Web site within a frame on one of their main pages. A problem with this approach is that the consumer does not have a consistent look and feel. What is needed is a shopping site that provides a uniform ordering and navigation from multiple merchants.

As e-commerce has developed, the term "shopping basket" or "shopping cart" has become commonly known on the Internet to refer to a virtual shopping cart where the consumer stores the products and/or services he/she is interested in purchasing while browsing a particular merchant's Web site. A shopping cart typically allows a consumer to add or delete products, specify attributes, such as color, quantity, size, and the like, and purchase products contained within the cart. Once the consumer has completed his/her selections of the products he or she is interested in purchasing, the consumer typically clicks on a link on one of the merchant's Web pages to purchase the contents of the shopping basket. A problem with the shopping carts, however, is that they are specific to each merchant. Another problem is that the shopping carts do not allow a consumer to keep products from different merchants not purchased in their shopping cart from one visit to the next shopping site. It would be desirable, therefore, to have a shopping cart that would maintain the items in the cart persistently until the consumer decides to delete the product or purchase the product.

Another problem is that the shopping site may "lose" the consumer after the consumer becomes interested in a product. For example, assume the shopping site returned two products from two different merchants based on the consumer's criteria. If the consumer clicks on the link for the first product the shopping site may either direct the consumer to Merchant A or may provide the merchant's site within a frame of the shopping site. Nevertheless, the consumer at this point is able to go directly to the merchant's site and bypass the shopping site when purchasing the products. It would be desirable, therefore, to provide a method and system by which consumers would not be directed to other merchants even though products they purchase may come from other merchants.

Accordingly, a method and system are needed that provide a consumer with a uniform ordering and navigation tool through multiple merchants. The method and system should enable the consumer to order products from multiple merchants using a single shopping cart. In addition, the method and system should provide the consumer with a consistent look and feel regardless of the merchant from whom the consumer is ordering products. Further, the method and system should provide a consistent matter of inputting and returning matches to a consumer searching a merchant's Web site. The present invention solves these problems as well as others presented by the prior art.

SUMMARY OF THE INVENTION

The present invention is directed to providing a method, apparatus and system for a unified product purchasing service ("UPPS") and order injection system. In particular, the present invention is directed to providing a shopping service that obtains products for a consumer across many different merchant sites while maintaining a consistent user interface for the consumer no matter from which merchant the products are retrieved or obtained. More specifically, the present invention allows a consumer to search for, compare prices and order products from many different merchants located on the Internet. The consumer completes all of their shopping on the shopping site provided by the present invention and is not directed to another merchant's site to complete an order.

The order injection system places orders for products from affiliated and non-affiliated merchants. Specific ordering details required from merchants external to the shopping site are hidden from the consumer. For example, if the external merchant site requires a consumer account before allowing the product to be purchased, the order injection system creates a new consumer account without intervention from the consumer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
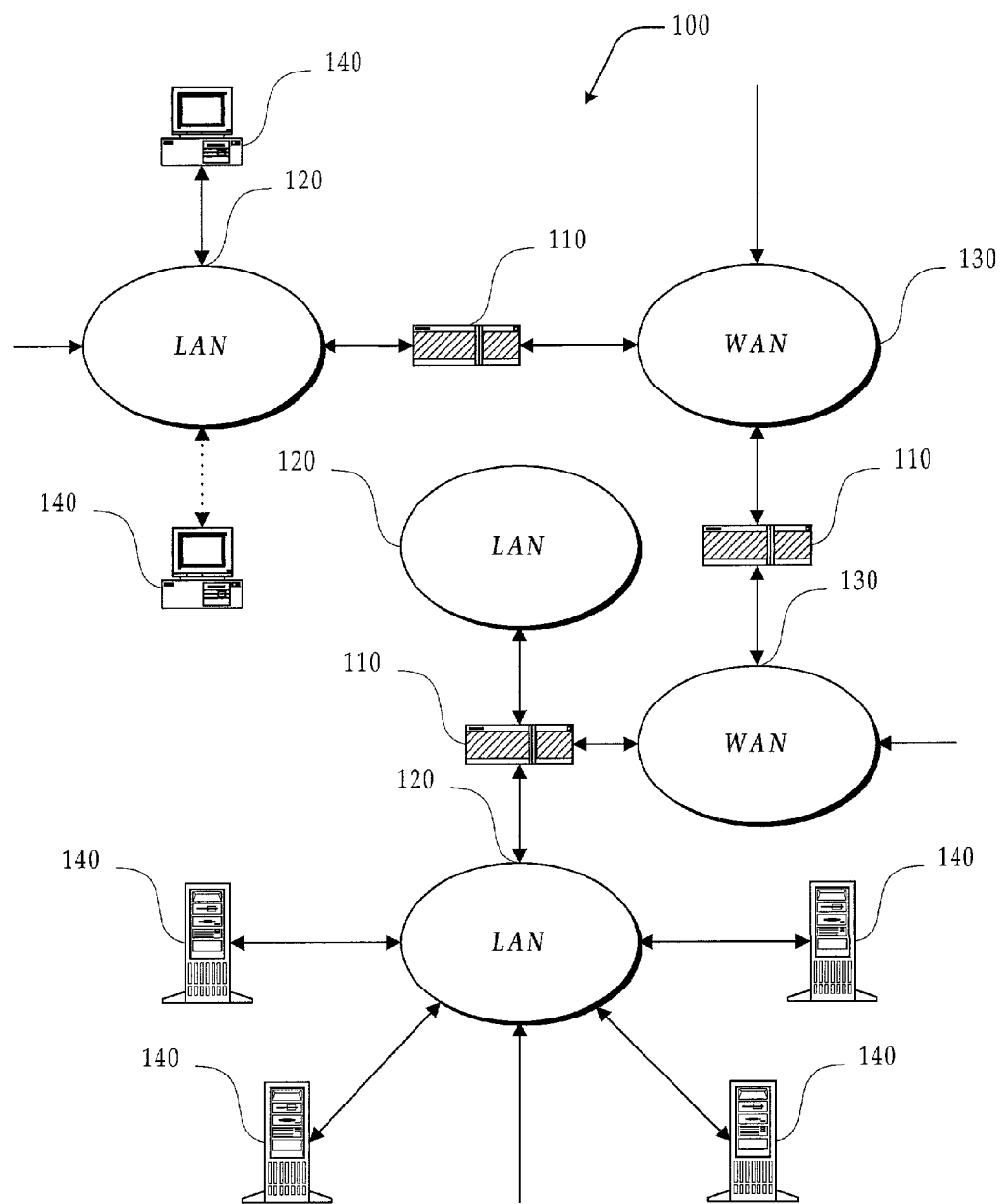
FIG. 1 (Prior Art) is an illustration of a representative portion of an internetwork such as the Internet.

As will be better understood from the following description, the present invention is embodied at least in part in a Web site accessible via the Internet. As is well known by those skilled in the art, the term "Internet" refers to the collection of networks and routers that use the transmission control protocol/Internet protocol ("TCP/IP") or next generation protocols to communicate with one another. A representative section of the Internet 100 is shown in FIG. 1. A plurality of local area networks ("LANs") 120 in a wide area network ("WAN") 130 are interconnected by routers 110. The routers 110 are special purpose computers used to interface one LAN or WAN to another. Communication links within the LANs may be twisted wire, coaxial cable, fiber-optic, wireless links or other communication links known to those skilled in the art. While communication links between networks may utilize analog telephone lines, digital lines, fiber-optic, wireless or other communication links known to those skilled in the art. Furthermore, computers, such as remote computers 140, and other related electronic devices such as telephones, personal digital assistants ("PDAs"), etc., can be remotely connected to either the LANs 120 or WANs 130 via a modem (not shown) and a temporary communication link, such as a telephone line or wireless connection (shown as a dotted line). As will be appreciated by those of ordinary skill in the art, the Internet 100 comprises a vast number of such interconnected networks, computers, and routers and that only a small, representative portion is shown in FIG. 1.

The Internet 100 has recently seen explosive growth by virtue of its ability to link computers located throughout the world. As the Internet 100 has grown, so has the Web. As will be readily appreciated by those skilled in the art, the Web is a vast collection of interconnected or "hypertext" documents formatted in the HyperText Markup Language ("HTML") or other markup languages that are electronically stored at Web sites throughout the Internet 100. A Web site resides on a server computer such as the import server 400 illustrated in FIG. 4 connected to the Internet 100 that has storage facilities for storing hypertext documents and that runs Web server software 460 for handling requests for those stored hypertext documents. A hypertext document normally includes a number of hyperlinks, usually displayed on a monitor as highlighted portions of text, which link the document to another hypertext document stored at the same Web site or some other Web site located elsewhere on the Internet 100. Each hyperlink is associated with a Uniform Resource Locator ("URL") that provides the location of the linked document on the Web server connected to the Internet. Thus, whenever a hypertext document is retrieved from any Web server, the document is considered to be retrieved from the Web. As is known to those skilled in the art, a Web server may also include facilities for storing and transmitting application programs, such as application programs written in the JAVA® programming language from Sun Microsystems for execution on a remote computer. Likewise, a Web server may also include facilities for executing scripts and other programs on the Web server itself.

A consumer or other remote user may retrieve hypertext documents from the Web via a Web browser application program. A Web browser, such as the NETSCAPE NAVIGATOR® browser or the MICROSOFT® Internet Explorer browser, is a software application program for providing a user interface with the Web. Upon request from the consumer via the Web browser, the Web browser accesses and retrieves the desired hypertext document from the appropriate Web server using the URL for the document and a protocol known as hypertext transfer protocol ("HTTP"). HTTP is a higher level protocol than TCP/IP and is designed specifically for the requirements of the Web. It is used on top of TCP/IP to transfer hypertext documents between servers and clients. The Web browser may also retrieve application programs from the Web server, such as JAVA applets, for execution on the consumer device 300. It will be appreciated by those skilled in the art that protocols other than HTTP may be used. For example, a URL might designate the file transfer protocol ("FTP") or Secure HyperText Transfer Protocol ("HTTPS").

The present invention is directed to providing a UPPS allowing the ordering and purchasing of products from many different merchants on the Internet. One embodiment of the invention provides a PUPS having a common user interface. The common user interface allows the consumer to purchase products from different merchants using the same user interface. For example, if a consumer is searching for books, videos and appliances, the consumer will likely be presented with books, videos and appliances from several different merchants. The consumer, however, will be able to order Book A from Merchant A, and Book B from Merchant B using the same ordering form.

Figure 2:
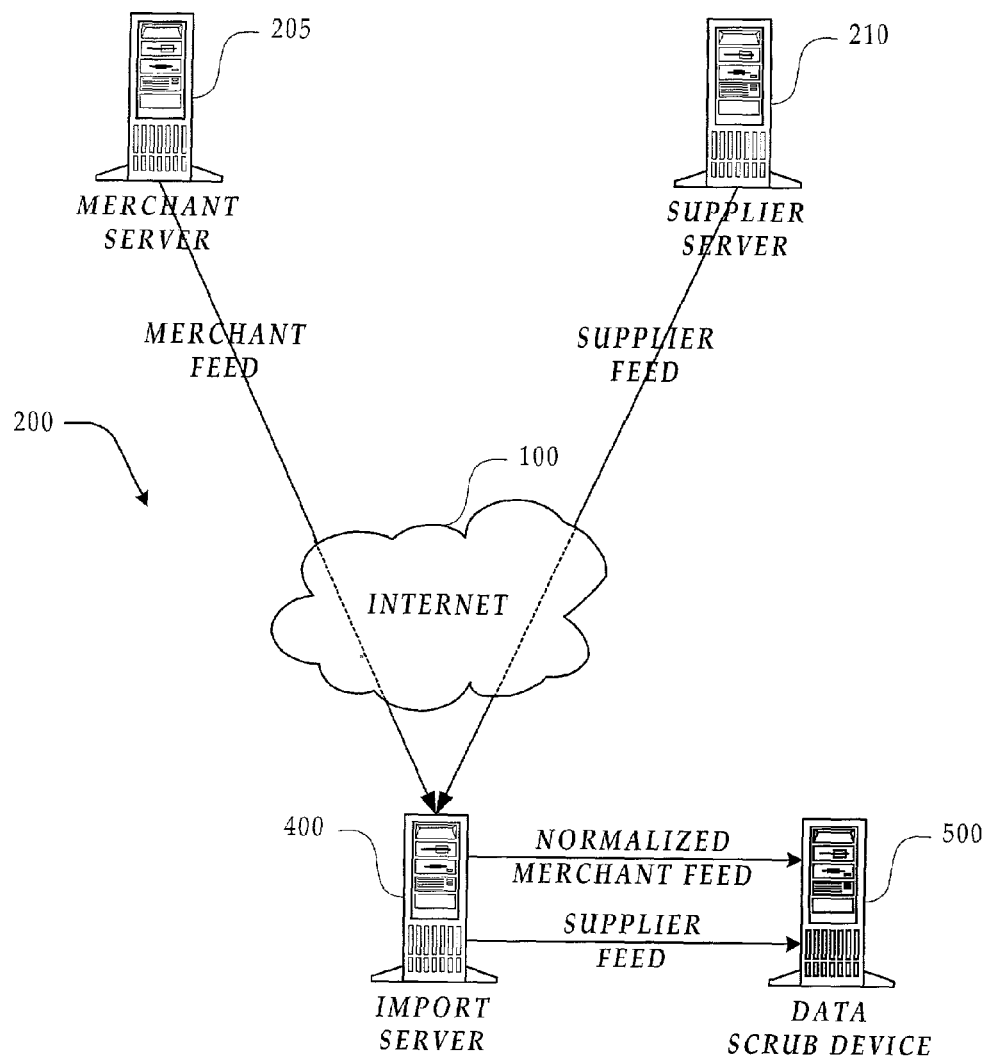
FIG. 2 is a pictorial diagram of a number of devices connected to an internetwork for processing product data from merchants or suppliers in accordance with the present invention.

A system 200 of computers and devices to which the import server 400 and data scrub device 500 are also connected is shown in detail in FIG. 2. In addition to the data scrub device 500 and the import server 400, the system 200 includes at least one supplier server 210 and at least one merchant server 205. Moreover, those of ordinary skill in the art will recognize that while only one data scrub device 500, one import server 400, one merchant server 205 and one supplier server 210 are depicted in FIG. 2, numerous merchant servers 205, supplier servers 210, import servers 400 and data scrub devices 500 may be interconnected to operate in accordance with the present invention.

In one embodiment of the invention, the import server 400 generates Web pages containing product information that can be viewed by the consumer using standard Web browsers. In another embodiment, the import server 400 creates a network presence, in which the import server 400 sends a customized data stream containing product and merchant information over the network to the consumer devices 300. The consumer device 300 uses a Web browser to provide a user interface configured to accept the data stream and to allow the consumer to search for and view product information, select products, and order products all using the same interface.

Figure 3:
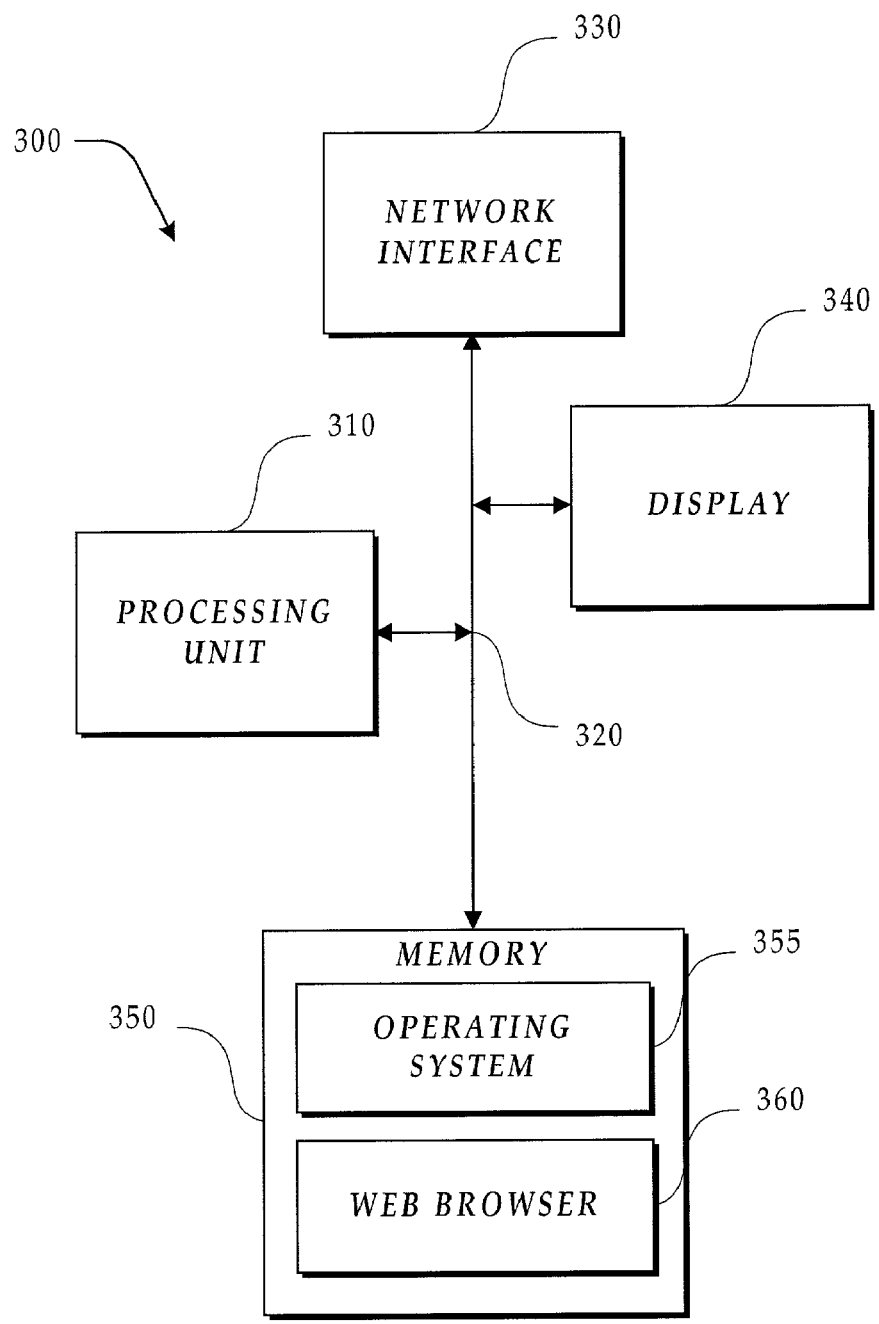
FIG. 3 is a block diagram illustrating several of the components of a consumer device.

FIG. 3 depicts several of the key components of a consumer device 300 used by a consumer to order products via the Internet in accordance with the present invention. Those of ordinary skill in the art will appreciate that the consumer device 300 includes many more components than those shown in FIG. 3. However, it is not necessary that all of these generally conventional components be shown in order to disclose an illustrative embodiment for practicing the present invention. As shown in FIG. 3, the consumer device 300 includes a network interface unit 330 for connecting to a LAN 120 or WAN 130. As will be appreciated by those of ordinary skill in the art, the network interface unit 330 includes the necessary circuitry for such a connection, and is also constructed for use with the TCP/IP protocol, the particular network configuration of the LAN 120 or WAN 130 it is connecting to, and a particular type of coupling medium. Alternatively, the consumer device 300 may also be equipped with a modem for connecting to the Internet through a point to point protocol ("PPP") connection or a serial line Internet protocol ("SLIP") connection as known to those skilled in the art.

The consumer device 300 also includes a central processing unit 310, a display 340 and a memory 350 connected via a bus 320. The memory 350 generally comprises random access memory ("RAM"), and read-only memory ("ROM") and a persistent mass storage device such as a hard disk drive. The memory 350 stores an operating system 355 for controlling the operation of the consumer device 300. The memory 350 also includes a Web browser 360, such as the NETSCAPE NAVIGATOR® browser or the MICROSOFT® Internet Explorer browser, for accessing the Web. Web browser 360 may also store a JAVA virtual machine used to execute JAVA "applets" as known to those skilled in the art. It will be appreciated that these components may be stored on a computer-readable medium and loaded into memory 350 of the consumer device 300 using a drive mechanism associated with the computer-readable medium, such as a floppy or a CD-ROM/DVD-ROM drive or the network adapter 330.

Although in one embodiment the consumer device 300 is a personal computer, those of ordinary skill in the art will appreciate that the consumer device 300 could be a wireless device such as a pager, a cellular telephone, Web-enabled landline telephone, PDA or any other type of consumer device 300 capable of communicating with the import server 400.

Figure 4:
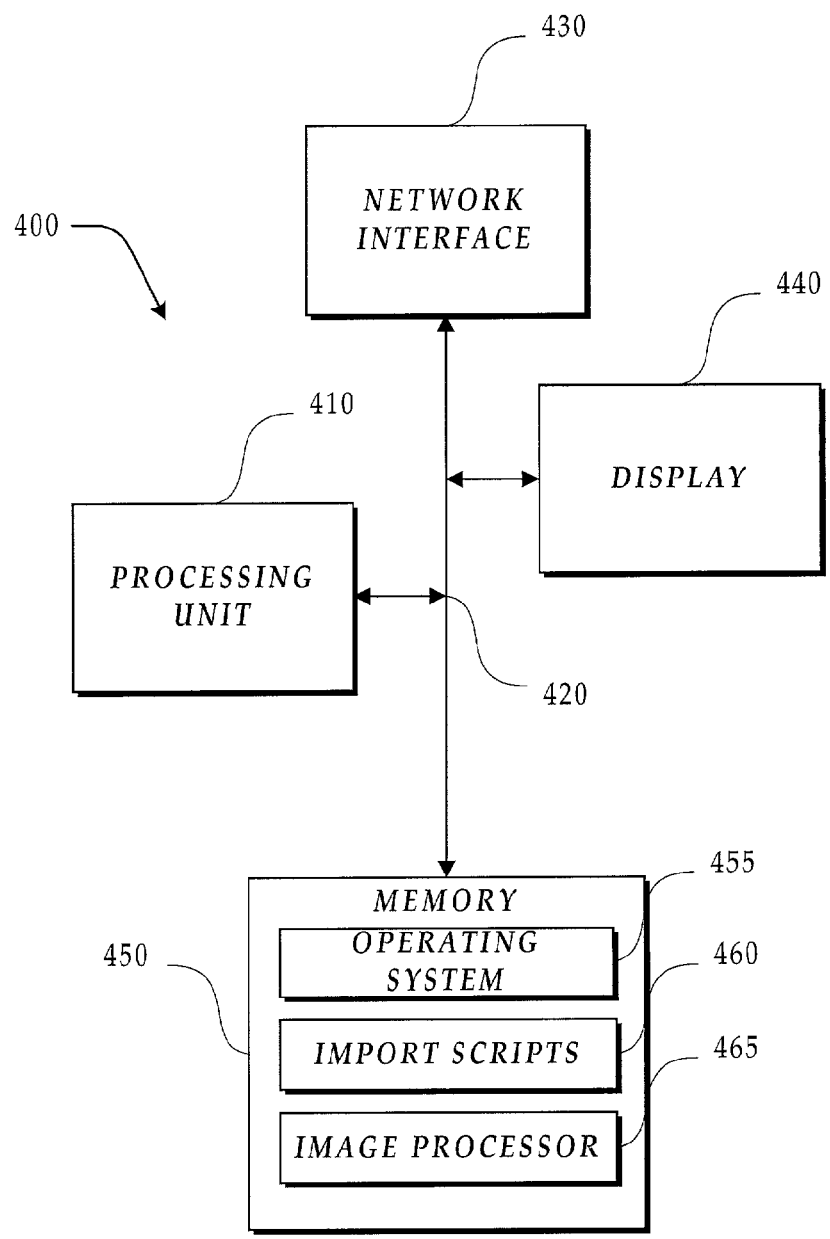
FIG. 4 is a block diagram illustrating several of the components of an import server.

FIG. 4 depicts several of the components of an import server 400 used to implement the present invention. Those of ordinary skill in the art will appreciate that the import server 400 includes many more components than those shown in FIG. 4. However, it is not necessary that all of these generally conventional components be shown in order to disclose an illustrative embodiment for practicing the present invention. As shown in FIG. 4, the import server 400 is connected to the Internet 100, or other communications network, via a network interface unit 430. Those of ordinary skill in the art will appreciate that the network interface unit 430 includes the necessary circuitry for connecting the import server 400 to the Internet 100, and is constructed for use with the TCP/IP protocol.

The import server 400 also includes a central processing unit ("CPU") 410, a display 440, and mass memory 450, connected via a bus 420. The memory 450 generally comprises RAM, ROM, and some form of persistent mass storage device, such as a hard disk drive, tape drive, optical drive (such as CD-ROM or DVD-ROM), floppy disk drive, or combination thereof. The memory 450 stores an operating system 455 for controlling the operation of the import server 400. It will be appreciated that the operating system may be formed by any one of several server operating systems well known to those of ordinary skill in the art, such as UNIX®, MAC OS® or MICROSOFT® WINDOWS NT®. In addition, memory 450 stores import scripts 460, as well as image processor software 465 for extracting and/or retrieving product images.

Figure 5:
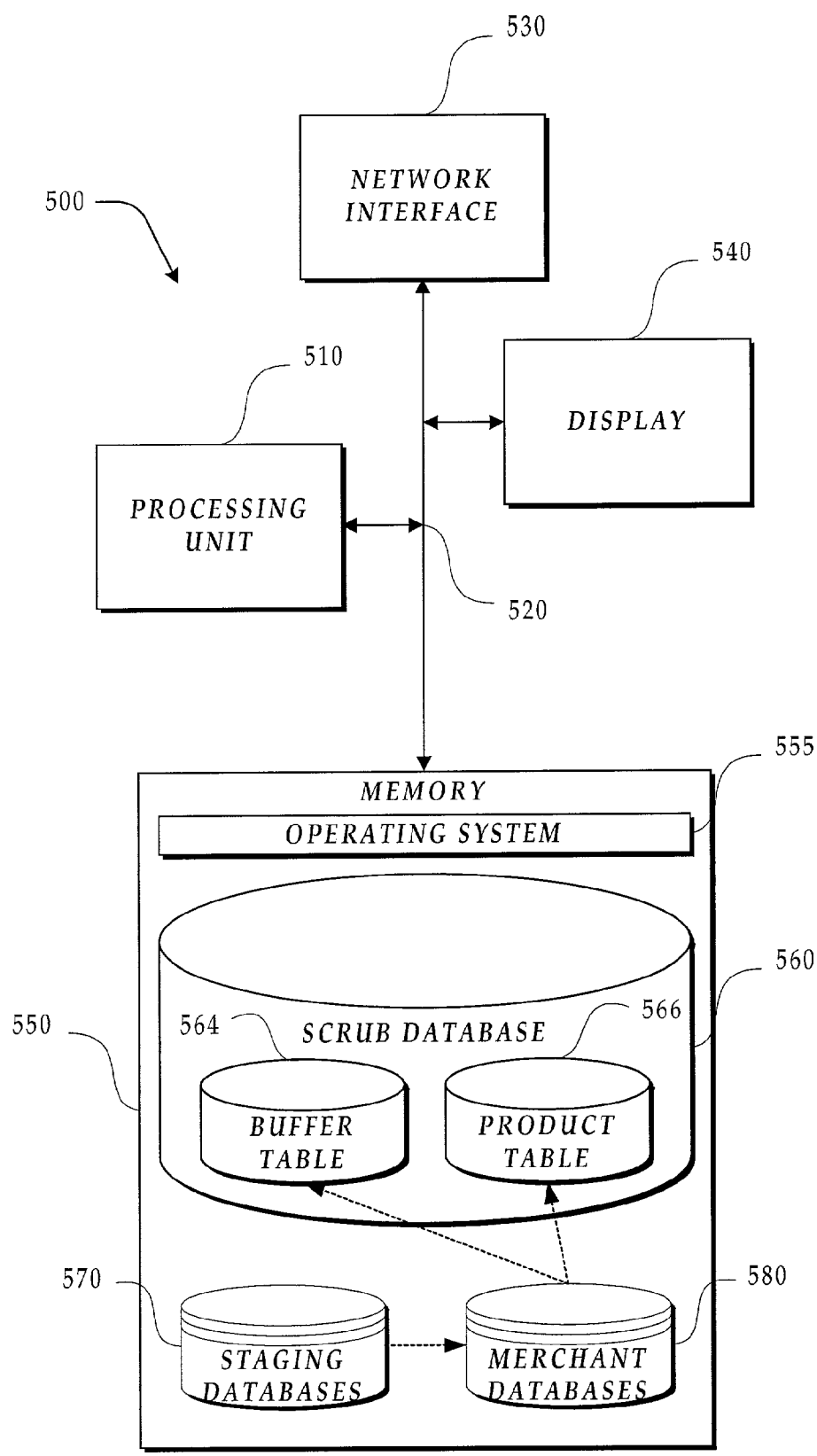
FIG. 5 is a block diagram illustrating several of the components of a data scrub device.

FIG. 5 depicts several of the key components of an exemplary data scrub device 500 used to implement the present invention. Those of ordinary skill in the art will appreciate that the data scrub device 500 includes many more components than those shown in FIG. 5. However, it is not necessary that all of these generally conventional components be shown in order to disclose an illustrative embodiment for practicing the present invention. As shown in FIG. 5, the data scrub device 500 includes a network interface unit 530 for connecting to a LAN 120 or WAN 130 (FIG. 1). As will be appreciated by those of ordinary skill in the art, the network interface unit 530 includes the necessary circuitry for such a connection, and is also constructed for use with the TCP/IP protocol, the particular network configuration of the LAN 120 or WAN 130 it is connecting to, and a particular type of coupling medium. Alternatively, the data scrub device 500 may also be equipped with a modem for connecting to the Internet through a PPP connection or a SLIP connection as known to those skilled in the art.

The data scrub device 500 also includes a central processing unit 510, a display 540 and a memory 550 connected via a bus 520. The memory 550 generally comprises RAM, and ROM and a persistent mass storage device such as a hard disk drive. The memory 550 stores an operating system 555 for controlling the operation of the data scrub device 500. The memory 550 also includes a scrub database 560, staging database 570 and merchant databases 580. Scrub database 560 in turn comprises a product table 566 and a buffer table 564. It will be appreciated that these components may be stored on a computer-readable medium and loaded into memory 550 of the data scrub device 500 using a drive mechanism associated with the computer-readable medium, such as a floppy or a CD-ROM/DVD-ROM drive or the network adapter 530.

In one embodiment of the invention, some of the components of the data scrub device 500 may be part of the import server 400 (FIGS. 2, 4).

Figure 6:
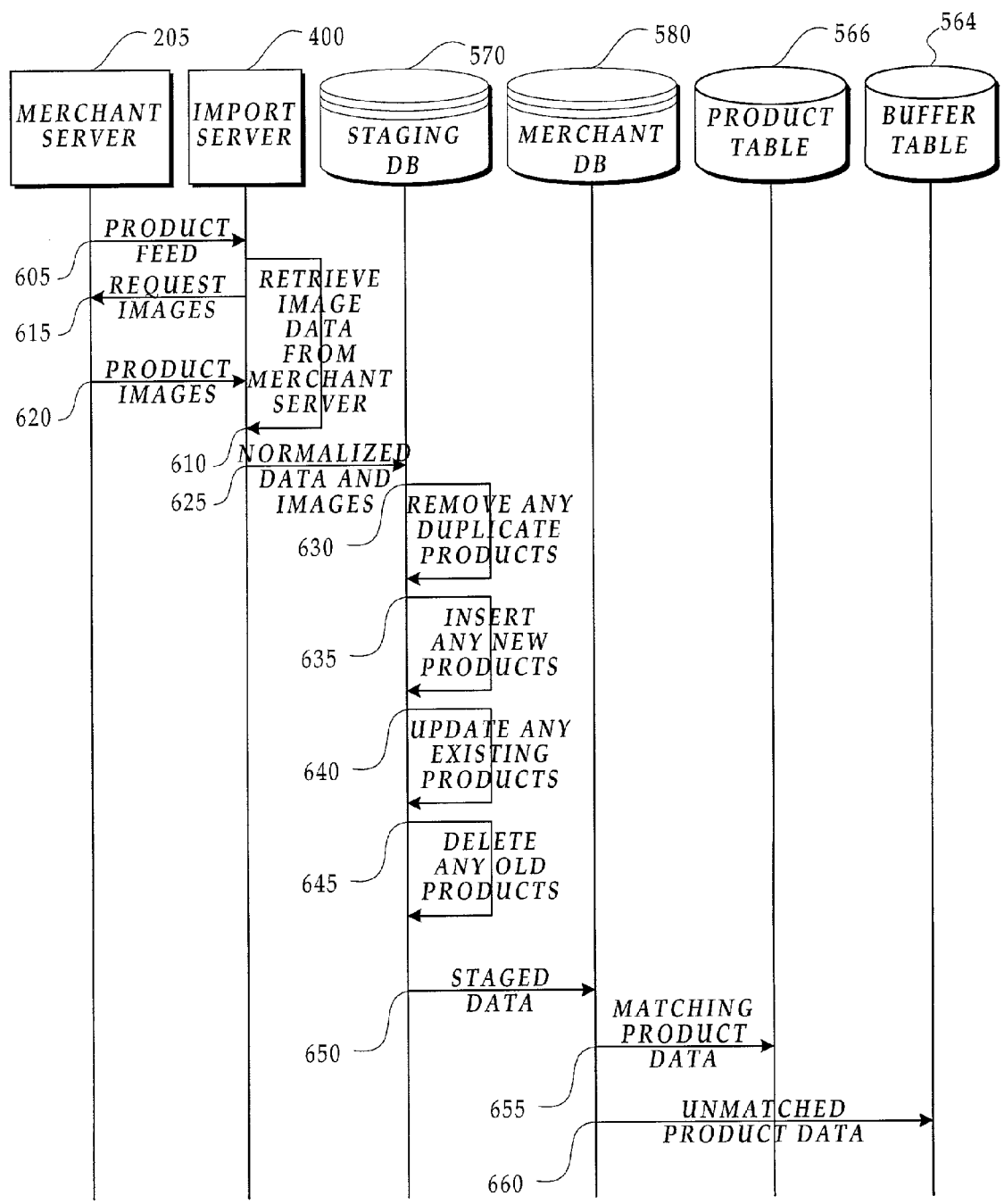
FIG. 6 is a diagram illustrating the actions taken by a merchant server, an import server, a staging database, a merchant database, a product table and a buffer table to gather product information to allow a consumer to purchase products and/or services using a UPPS in accordance with the present invention.

FIG. 6 illustrates the actions taken by the merchant server 205, import server 400, staging databases 570, merchant databases 580, product table 566 and buffer table 564 together product information to enable searching, viewing and purchasing through the UPPS hereinafter referred as UPPS in accordance with the present invention. (Both the staging databases 570 and merchant databases 580 have a separate database for each merchant or supplier of product data. Accordingly, when referring to a single merchant or supplier, the staging databases 570 and merchant database 580 will be referred to in the singular.) The interactions of the various components are illustrated and described in greater detail later with reference to diagrams shown in FIGS. 8 and 9. Returning to FIG. 6, the product data import process is initiated when a merchant server 205 provides a product feed 605 to an import server 400. The import server 400 is then able to retrieve 610 image data from the merchant server that relates to the products described in the product feed. The import server requests images 615 from the merchant server and receives product images 620 back from the merchant server. The product feed in the form of normalized data and images 625 is then forwarded to the staging databases 570. The staging database is where duplicate products are removed 630, new products are inserted 635, existing products are updated 640, and old products are deleted 645. Next, the information from the particular staging database 570 associated with the originating merchant server 205 forwards the staged normalized data which is just the normalized data feed that has been updated with the information and processing performed on that particular staging database 570. This staged data 650 is passed to the merchant databases and in particular to the merchant database 580 associated with the originating merchant server 205. The merchant database 580 then forwards 655 matching product data to the product table 566 and forwards unmatched product data 660 to the buffer table 564. Matching and unmatched product data will be discussed in greater detail below with regard to FIG. 9.

Figure 7:
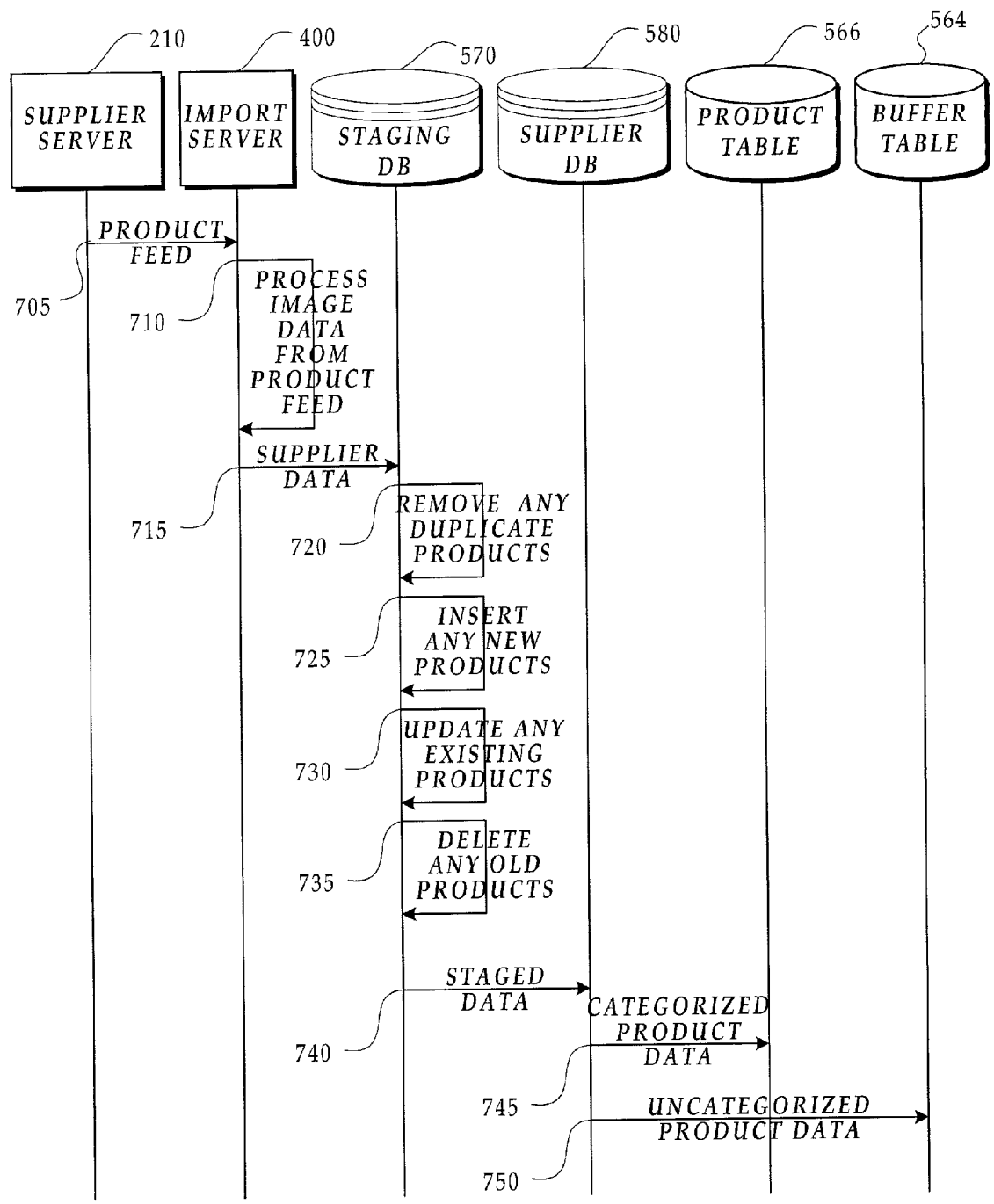
FIG. 7 is a diagram illustrating the actions taken by a supplier server, an import server, a staging database, a merchant database, a product table and a buffer table to gather product information to allow a consumer to purchase products and/or services using a UPPS in accordance with the present invention.

FIG. 7 illustrates the actions taken by the supplier server 210, import server 400, staging databases 570, merchant databases 580, product table 566 and buffer table 564. Together product information to enable searching, viewing and purchasing through the UPPS hereinafter referred as UPPS in accordance with the present invention. The interactions of the various components are illustrated and described in greater detail later with reference to diagrams shown in FIGS. 8 and 9. Returning to FIG. 7, the product data import process is initiated when a supplier server 210 provides a product feed 705 to an import server 400. The import server 400 is then able to extract and process 710 image data from the product feed that relates to the products described in the product feed. The product feed in the form of supplier (normalized) data and images 715 is then forwarded to the staging databases 570. The staging database 570 is where duplicate products are removed 720, new products are inserted 725, existing products are updated 730, and old products are deleted 735. Next, the information from the particular staging database 570 associated with the originating supplier server 210 forwards the staged normalized data which is just the normalized data feed that has been updated with the information and processing performed on that particular staging database 570. This staged data 740 is passed to the merchant (in this case also supplier) databases 580 and in particular to the merchant database 580 associated with the originating supplier server 210. The merchant database 580 then forwards 745 categorized product data to the product table 566 and forwards uncategorized product data 750 to the buffer table 564.

It will be appreciated by those of ordinary skill in the art that the order of the operations in FIG. 6 or 7 may be altered without substantially affecting the operation of the present invention. For example, the merchant database 580 may be incorporated into the staging database 570; or some or all of steps 630-645 may be performed in other orders or even on the merchant database 580.

Figure 8:
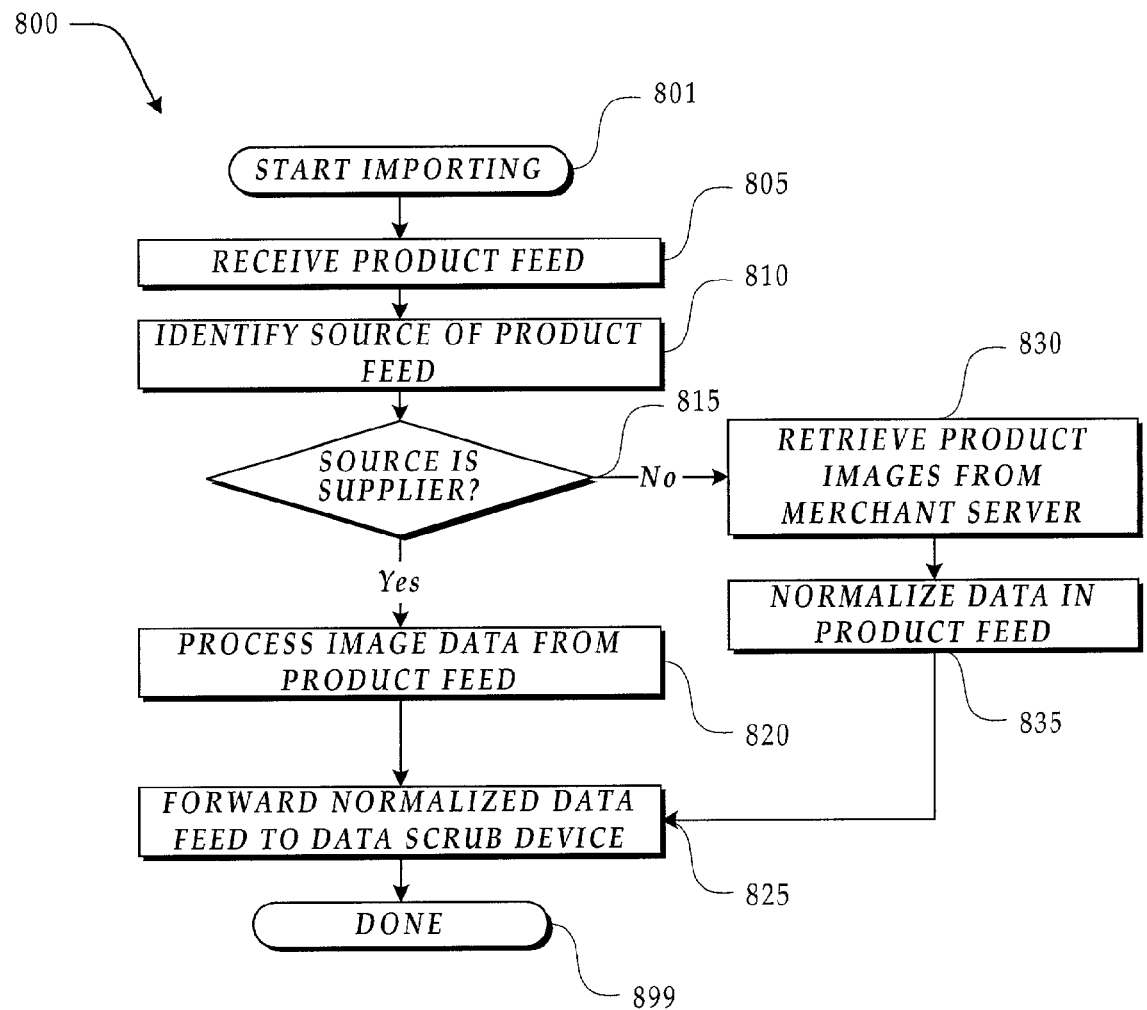
FIG. 8 is an overview flow diagram illustrating a process for importing product data from a product feed into an import server.

The present invention is directed to providing a shopping service that obtains products for a consumer across many different merchant sites while maintaining a consistent user interface for the consumer no matter from which merchant the products are retrieved or obtained. Instead of redirecting the consumer to an external site when the consumer selects a product located on an external merchant site, the import server 400 maintains control of the consumer throughout the entire shopping process. Accordingly, FIG. 8 illustrates an exemplary logic routine 800 illustrating importing product data from a product feed into an import server 400 in accordance with the present invention. Routine 800 starts at block 801 and proceeds to block 805 where the product feed is received. Next, in block 810, the identity of the source of the product feed (e.g., merchant or supplier) is found from the product feed itself or from the address from which it was received (e.g. a URL for the supplier website). If the source of the product feed in decision block 815 is determined to be a supplier, then in block 820, image data is extracted and processed from embedded images within the product feed. In block 825, the supplier product feed which was received in a normalized form is forwarded to the data scrub device. If, however, in decision block 815, it was determined that the source of the product feed was not a supplier, then the flow goes to block 830 where product images have to be retrieved from the merchant server associated with the merchant product feed. In one embodiment of the invention, product information and/or product images are obtained by scraping a merchant server's 205 Web site. For a description of scraping please refer to FIG. 14 described below and to commonly owned U.S. patent application Ser. No. 09/237169 filed Jan. 25, 1999 and entitled WEB SCRAPING ENGINE, which is incorporated herein by reference. In block 835, the merchant product feed is normalized so that it can be incorporated more easily into the databases of the current invention. Included in this normalization are the images retrieved from the merchant server. Processing then continues back to block 825, and the normalized data from the merchant feed now is of the same normalized format as if it had been supplier provided data. Processing then ends at block 899.

Figure 9:
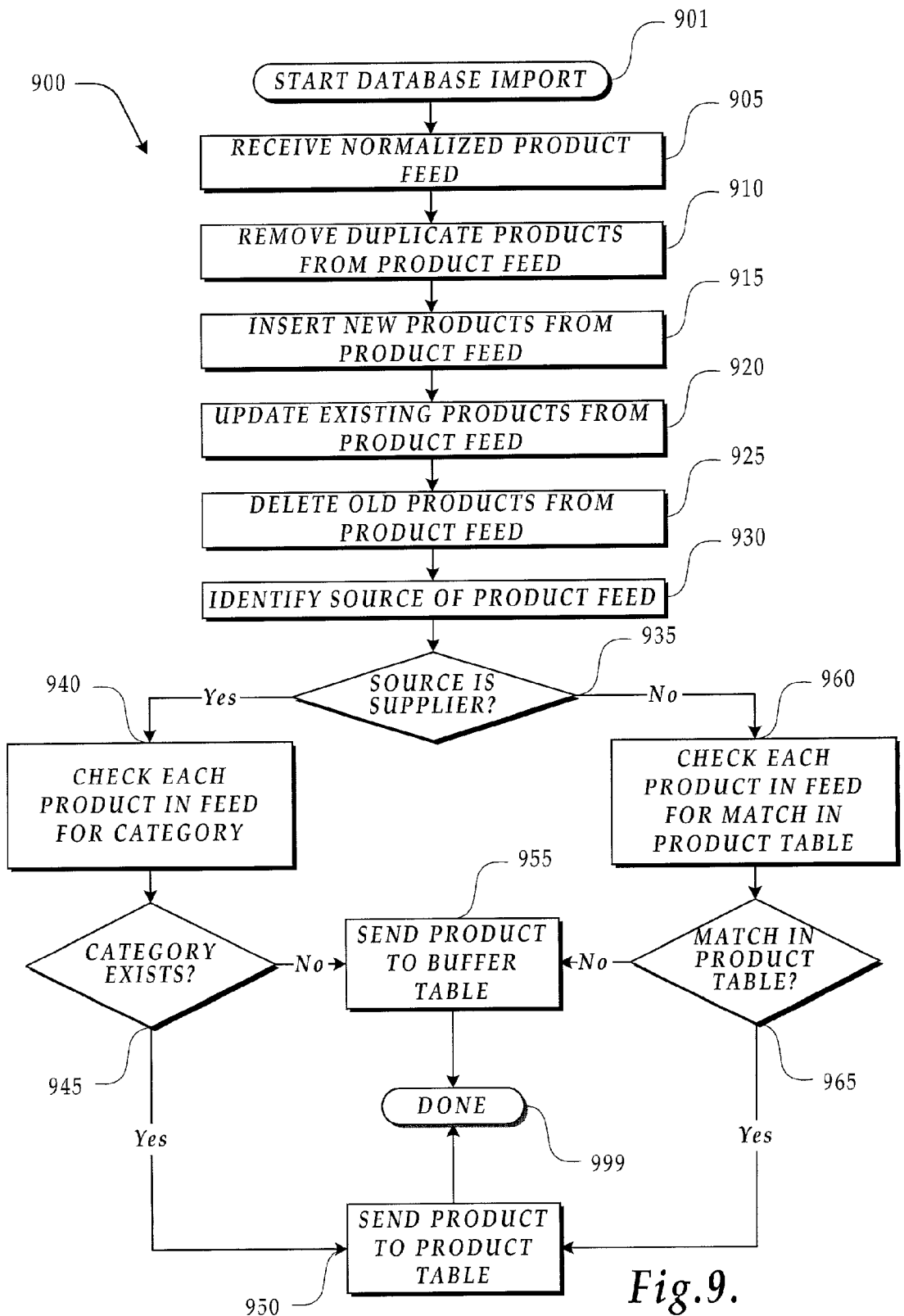
FIG. 9 is an overview flow diagram illustrating a process for importing product data through multiple stage databases from a product feed.

The product feed and any accompanying images have now been normalized for incorporation through the various databases (staging database 570, merchant database 580, and scrub database 560, including buffer table 564 and product table 566 (FIG. 5)) in accordance with the present invention. FIG. 9 illustrates an exemplary logic routine 900 illustrating importing the product data from the product feed through these databases. Routine 900 starts at block 901 and proceeds to block 905 where the normalized product feed is received.

In one exemplary embodiment, the first database receiving the normalized product feed is the staging database 570. However, other databases, such as the merchant database 580, could be the first to receive the normalized product feed. At the database level, duplicate products are removed from the product feed in block 910. In block 915, new products from the product feed are inserted into the database. In block 920, existing products are updated based on the normalized product feed. Next, in block 925, any expired or old products that are no longer in the product feed may be deleted. (It is important to reiterate here that the staging databases 570 and merchant databases 580 are referred to both in the plural and the singular, as the collection of staging databases 570 and the collection of merchant databases 580 contain a separate database each for every supplier and merchant which provide product feeds in accordance with the present invention.)

It will be appreciated by those of ordinary skill in the art that steps 910-925 for updating the databases may be performed in a different order from that depicted in FIG. 9, depending upon specific implementation of the present invention, without departing from the spirit of the invention as specified herein.

Once routine 900 gets to block 930, it then needs to identify the source of the product feed as that will determine how entries in the product feed will be incorporated into the product table and/or buffer table. So, in block 930, the source is identified and in decision block 935, if it is determined that the source of the product data is a supplier, then in block 940, the product entries in the product feed are only checked to see if they have been categorized or that the category already exists in the product table. If, in decision block 945 it is determined that the category exists for a product entry, then that product entry is sent to the product table. If, in block 945 it is determined that the product is uncategorized or that no category exists in the product table that matches the category of the particular product entry, then the product is sent to the buffer table for further processing at a later point, in block 955.

Returning back to decision block 935, if the source is not a supplier, then in block 960, each product entry is checked to see if there is a match in the product database. It will be appreciated by those of ordinary skill in the art that matching product entries in the product feed and product entries in the product table may be done in a myriad of fashions. In one exemplary embodiment, the shopkeeper unit ("SKU") is used to match products in the product feed and the product table. Alternately, in another embodiment, manufacturer name and manufacturer model number may be used to match entries in the product feed and product table 566 (FIG. 5). However, other uniquely identifying information may also be used to match product entries in the product feed to product entries in the product table 566.

Next, in decision block 965, if it is determined that there is a match between a product entry in the product feed and a product entry in the product table, then the product table is updated with the product entry from the product feed, thereby resulting in a more up-to-date entry with regard to that product in the product table 566. If, however, in decision block 965 it is determined that there is no matching product in the product table, then the product entry is forwarded to the buffer table in block 955 for processing at a later point. In any case, processing and of routine 900 ends at block 999.

Once the product feed has been imported into the system of the current invention, including the product table in the scrub database, it will then be used in a commercial side system open to the public; however, this is usually not done directly, rather, the information is sent to devices, servers, and databases accessible by the public, using the product table as a master source of sorts.

Figure 10:
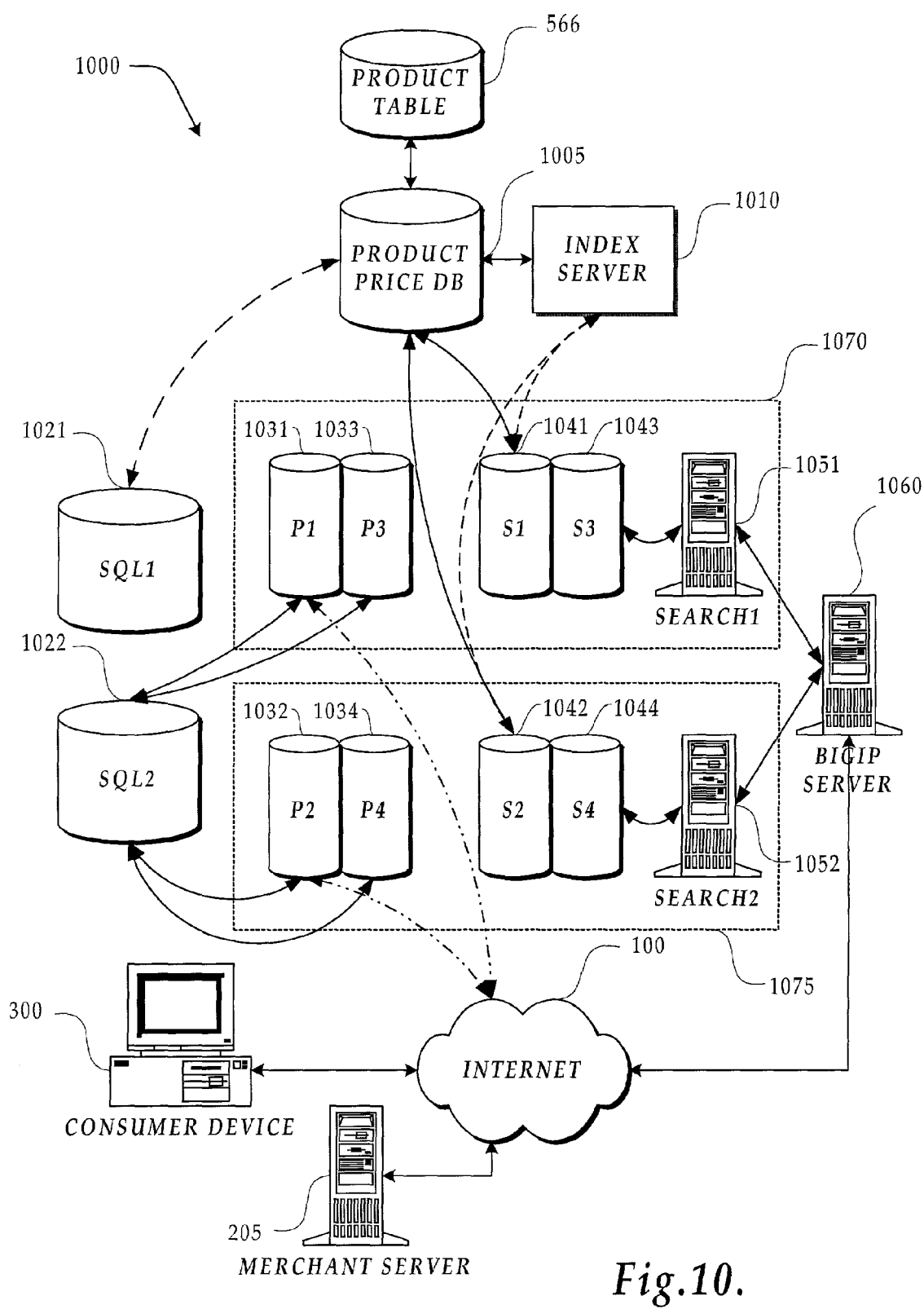
FIG. 10 is a pictorial diagram of a number of devices connected to an internetwork which allow a consumer device also connected to the internetwork to purchase products and/or services in accordance with the present invention.
Figure 11A:
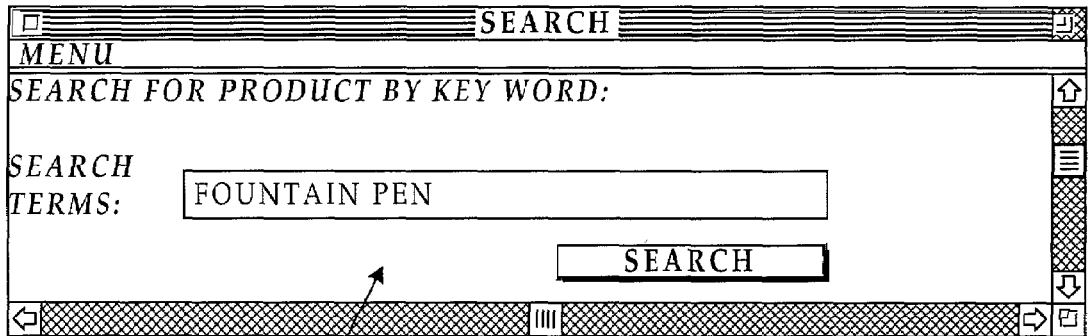
FIGS. 11A-11C and 12A-12B are exemplary Web pages illustrating searching and shopping on an e-commerce site.
Figure 11B:
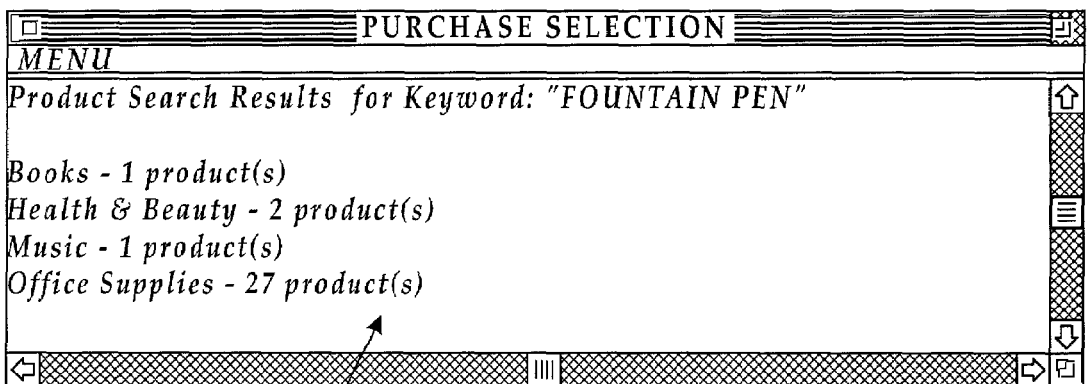
Figure 11C:
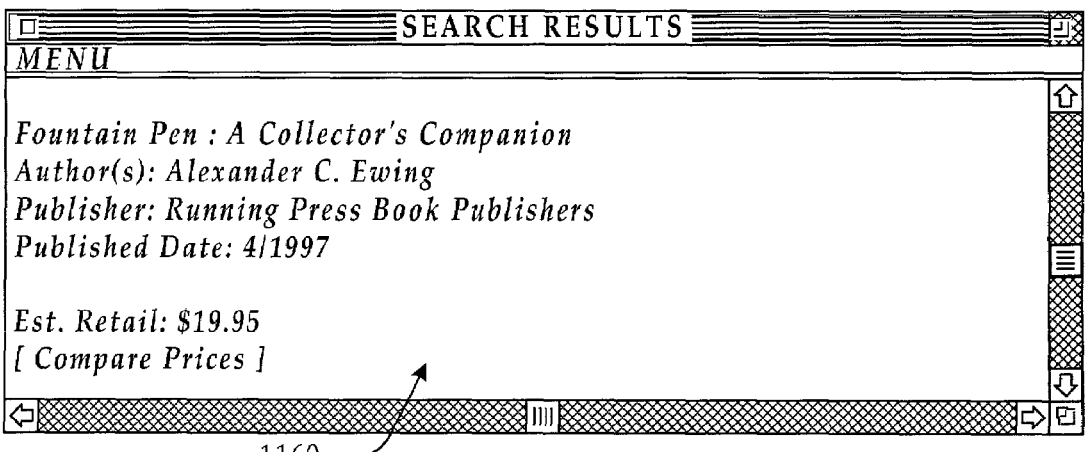

Accordingly, FIG. 10 illustrates one exemplary commercial side system with a number of components. The system 1000 is set up as a load balanced, redundant system with both active and inactive databases in each component. The information from the product table 566 is forwarded to a product price database 1005. The product price database 1005 is updated periodically such as once an hour, once a day, once a week, and so forth; again, preserving the product table as the master source from which the data is received.

An index server 1010 then takes the information in the product price database 1005 and indexes it using conventional keyword and database indexing routines known to those of ordinary skill in the art. The index server supplies index meta-data or data about the index and other index data for the products in the product price database to search servers, such as search servers #1 and #2, 1041 and 1042, shown in FIG. 10. The product price database 1005 also supplies product details, such as descriptions and images, that correspond to the information sent by the index server 1010. Note that while search database #1 1041 and search database #2 1042 are being updated, search database #3 1043 and search database #4 1044 are actually online and are in communication with a search server #1 1051 and a search server #2 1052, respectively. This allows search databases #3 and #4, 1043 and 1044 respectively, to remain fully active while search server #1 1041 and search database #2 1042 are being updated. Search databases #1-4 1041-1044 are mirrored databases which means that when one is finished updating, the updated information is then mirrored to the next. For example, in FIG. 10, once search database #1 1041 is finished receiving index information and product information, search server #3 1043 will be taken offline, and the same information will be added to search server #3.

The load balancing of the illustrated embodiment is handled by the "big IP" server 1060 which is a conventional load balancing server known to those of ordinary skill in the art to allow the communications load to be distributed across components of the present invention. The "big IP" server 1060 is connected via the Internet 100 to the consumer device or devices 300 and merchant servers 205.

Returning back to the databases, the pricing databases #1-4 1031-1034 are in communication with mirrored SQL servers #1 and #2 1021-1022, such that when a consumer has finished searching for products using search server #1 1051 or search server #2 1052, they are then able to retrieve detailed information from pricing databases #1-4 1031-1034. Note again that with SQL #1 and SQL#2, while SQL#1 1021 is being updated from the product price database 1005, SQL #2 1022 is in communication with the pricing databases, and that while pricing database #1 1031 and pricing database #2 1032 are accessible by consumers via the Internet 100, pricing database #3 1033 and pricing database #4 1034 are in communication with SQL database #2 to update their information.

While one possible embodiment is shown here, it need hardly be mentioned that this commercial side of the present invention could have a myriad of other possible configurations, not the least would be a much simpler system where only the product table was used instead of the product price database index server, sequel databases, pricing databases, search databases, and search servers and with no load balancing at all. However, each one of these components does increase either the speed, flexibility, or reliability of the overall system and have been included to illustrate one exemplary embodiment of how the present invention may be implemented.

As will be appreciated by those of ordinary skill in the art, identifying and searching for products can be done in many different ways. For example, in one embodiment of the invention, the consumer enters information about the products into a search engine. Based on the information input into the search engine, a list of products is returned to the consumer on a Web page. In another embodiment of the invention, the search engine may search a database stored on the import server 400 containing a list of currently available products from many different merchants. In another embodiment, the search engine searches external databases that are not contained on the import server 400 but are located on remote computers. As will be appreciated by those of ordinary skill in the art, many different search engines can be used. In yet another embodiment, a classification system is established that divides goods or services into categories of specific types. For example, categories can include, among many others, clothes, books, music, video, jewelry and the like.

Figure 12A:
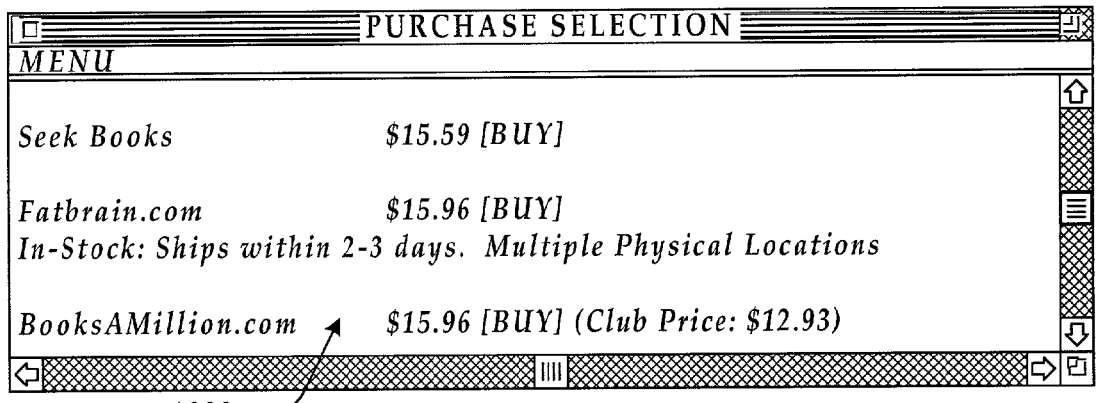
Figure 12B:
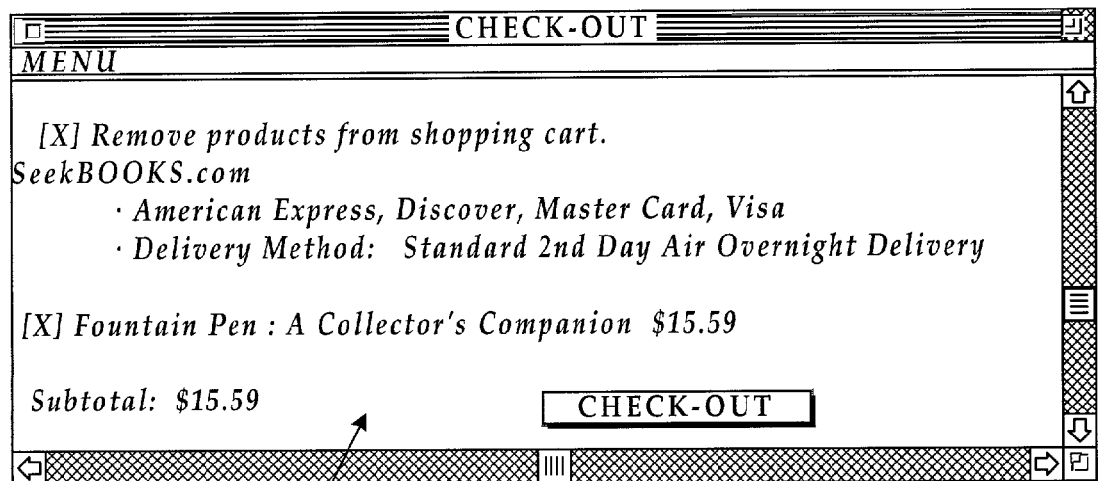

In one embodiment of the present invention, the consumer browses through product search results on a Web page (see FIGURES 1A-11C and description below) provided by a search server 1041, 1042, 1043 or 1044. In another embodiment, the search results are sent electronically to a wireless device, such as a telephone, or PDA. As will be appreciated by those of ordinary skill in the art, wireless devices are more restricted by the amount of information they may display as compared to a personal computer. Therefore, the information sent to the wireless device is formatted for viewing on a wireless device. Well known presentation formats for wireless devices are Handheld Device Markup Language ("HDML") documents and Wireless Markup Language ("WML") documents. As will be appreciated by those skilled in the arts, HDML and WML documents may be viewed on conventional microbrowsers such as phone.com's™ UP.link microbrowsers. If the consumer is interested in a particular product, the product may be added to the consumer's shopping cart (see FIGS. 12A and 12B and description below). In one embodiment of the invention, the consumer selects the product by clicking on a hyperlink to add the product to the service. As will be appreciated by those of ordinary skill in the art, there are many methods of selecting a product. For example, a consumer may drag an icon or hyperlink representing the product to an icon or hyperlink representing the shopping cart.

For clarity of illustration, the phrase "product type" will be used to described a type of merchandise that is sold be several merchants. For example, an "NEC 17 inch LCD monitor" is a "product type". The phrase "product" will be used to describe an item that is carried by a particular merchant. For example, an "NEC 17 inch LCD monitor from Circuit City" is a "product". When a consumer selects a product, both the product type and the merchant are determined.

FIGS. 11A-12B illustrate exemplary Web pages for searching, viewing and selecting a product in accordance with the present invention. Web page 1100 illustrates an exemplary Web page form having a field for searching for specific products. The results of an exemplary search are shown in Web page 1130. After selecting a type of product from Web page 1130, a consumer might see a Web page such as exemplary viewing Web page 1160 where the consumer is presented with the detailed description of the selected product along with a link to compare prices and handling details from different merchants. Web page 1200 shows a number of different merchants with different prices and/or handling details. Finally, Web page 1260 illustrates a selected product from a particular merchant that is ready to be checked out.

Another aspect of the current invention allows for a more full, accurate and detailed product coverage in the product table. Specifically, the data scrubbing ability of the current invention which is the process of analyzing the product entries which have been placed in the buffer table 564 due to being either uncategorized or unmatched with existing products in the product table 566. Data scrubbing can either be an automatic process or a manual process each of which is reflected in FIG. 13 or 14, respectively.

Figure 13:
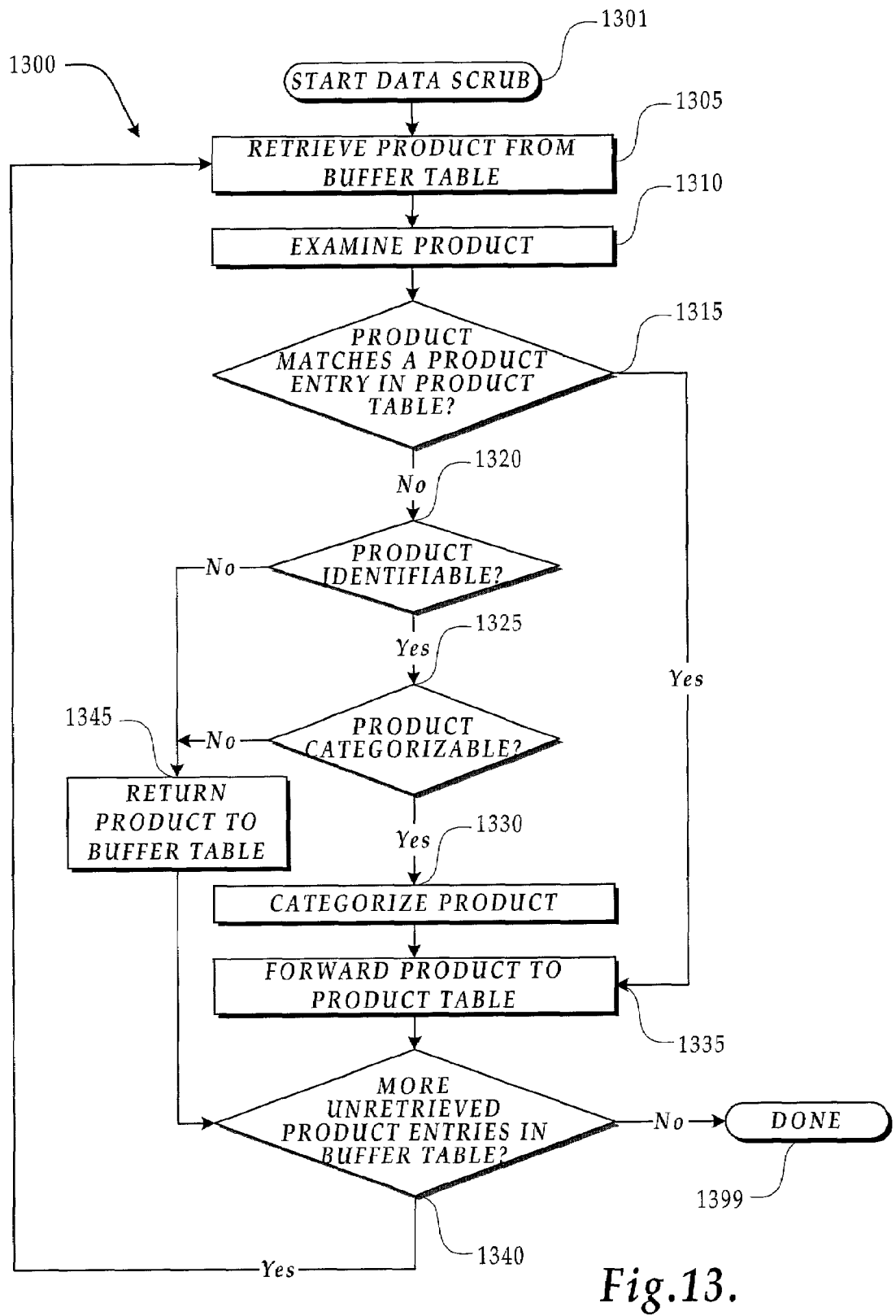
FIG. 13 is a flow chart illustrating an automated data scrub of a buffer table in accordance with the present invention.

FIG. 13 is a flow chart illustrating a routine 1300 for automatic data scrubbing. Routine 1300 starts in block 1301 and proceeds to block 1305 where a product entry is retrieved from the buffer table. In block 1310, the product entry is examined. Then in decision block 1315, if it is found that the product matches the product entry in the product table, it is automatically forwarded to the product table and requires no further scrubbing. However, if in decision block 1315 it was found that the product did not match an entry in the product table, processing continues to decision block 1320 where it is determined if the product is identifiable. Specifically, is this a valid product for which a product entry can be made within the product table? If it is not identifiable, then in block 1345, the product is returned to the buffer table for analysis at a later date or eventual expiration. However, if in decision block 1320 the product is identifiable, then in decision block 1325 it is determined whether the product is categorizable, specifically, if the product will fall into a type of category. One example might be that two separate products might have the same title; however further information would show that they were in different categories. A product title such the name "fountain pen" might be the title of a book or a description of a writing instrument. Therefore, the data scrub routine 1300 looks to additional information to see if there is any indication that the product would fall in one category versus another, e.g., books or office supplies. If the product is categorizable, then processing continues to 1330 where a category is assigned to the product; then, in block 1335 the product is forwarded to the product database 566. If however in decision block 1325 the product is not categorizable, it placed back in the buffer table in block 1345. Finally, in decision block 1340, a determination is made if there are any more unretrieved product entries in the buffer table. If all entries have been retrieved, then processing ends in 1399, otherwise it returns back to block 1305 to continue scrubbing the buffer table.

Figure 14:
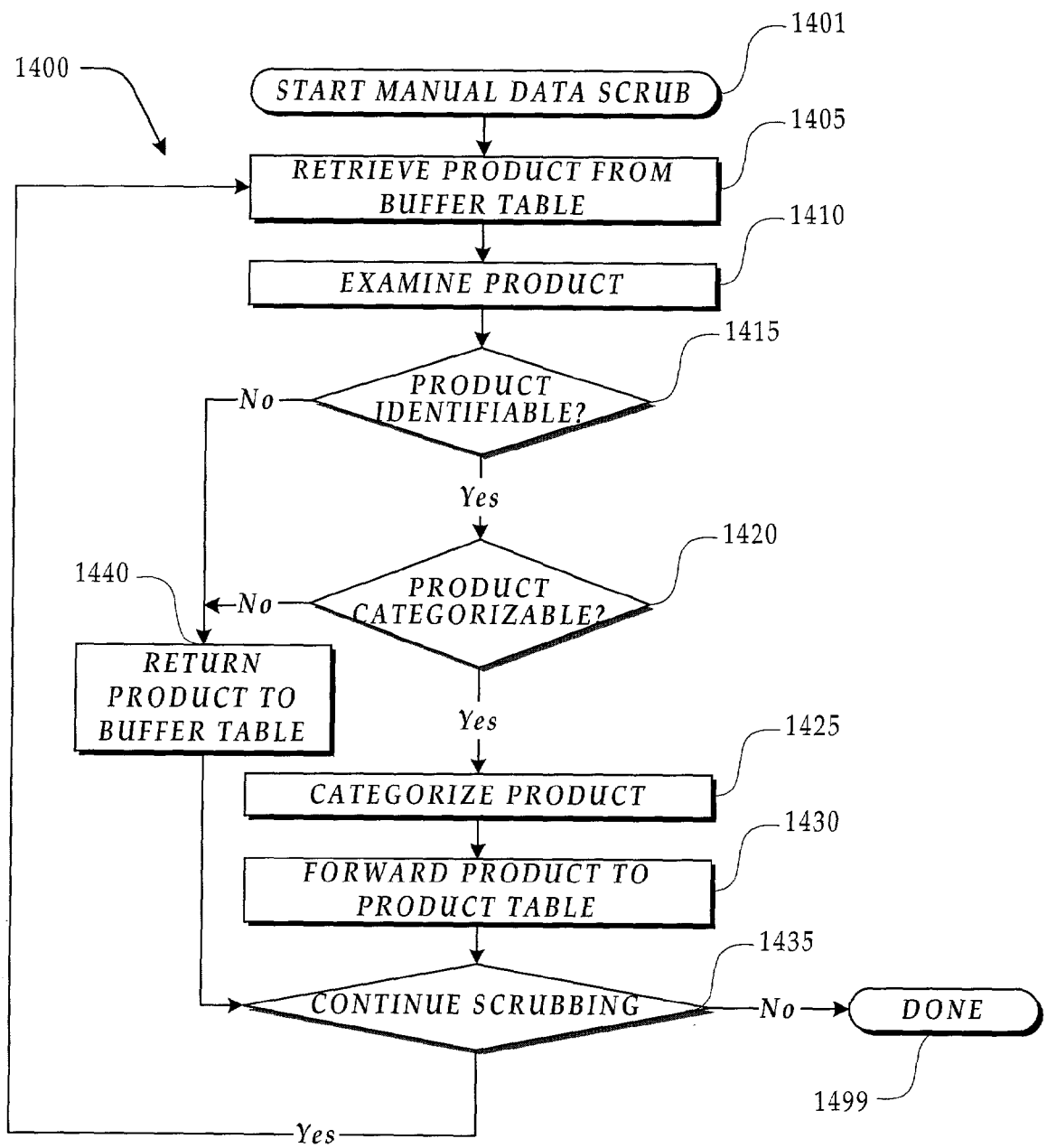
FIG. 14 is a flow chart illustrating a manual data scrub of a buffer table in accordance with the present invention.

Similar to FIG. 13, FIG. 14 is a flowchart illustrating a manual data scrubbing routine 1400. Routine 1400 starts in block 1401 and proceeds to block 1405 where a product entry is retrieved from the buffer table. In block 1410, the product entry is examined. Then in decision block 1415, it is determined whether the product is identifiable. Specifically, does the product entry describe a valid product for which a product entry can be made within the product table? If it is not identifiable, then in block 1440, the product is returned to the buffer table for analysis at a later date or eventual expiration. However, if in decision block 1415 the product is determined to be identifiable, then in decision block 1420 it is determined whether the product is categorizable, specifically, if the product will fall into a type of category. If the product is categorizable, then processing continues to 1425 where a category is assigned to the product; then, in block 1430 the product is forwarded to the product database 566. If however in decision block 1420 the product is not categorizable, it placed back in the buffer table 564 (FIG. 5) in block 1440. Finally, in decision block 1435, a determination is made whether to continue scrubbing, if not, then processing ends in 1499, otherwise processing returns back to block 1405 to continue manual scrubbing the buffer table.

The embodiments of the present invention have been described in the consumermerchant context in which the consumer orders products from merchants or suppliers. The present invention can also be applied to a business-to-business e-commerce context to allow non-consumer entities to purchase goods and/or services.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for collecting product data to facilitate at least one of searching, comparing prices, viewing and ordering products at a single shopping website, comprising:

retrieving, by a host computer, a product feed from a plurality of websites associated with at least one of suppliers and merchants;

determining a source of said product feed, wherein said source is said at least one of said suppliers and merchants;

extracting an image from said product feed when said source is a supplier;

retrieving an image from a website of said merchant when said source is a merchant;

creating a normalized data feed from said product feed;

parsing said normalized data feed and either said extracted image or said retrieved image into categorized data elements to determine when a category exists in a product table which corresponds to said categorized data elements, wherein said categorized data elements are added to a buffer table when said category does not exist and said categorized data elements are integrated with stored product data within said product table when said category exists to create integrated data; and, providing said integrated data to a user such that said user may utilize a single shopping website to search for, compare prices and order said products, wherein said products are associated with said stored product data from a plurality of websites, wherein each of said plurality of websites may be associated with a different at least one of said suppliers and said merchants.

2. The method of claim 1, wherein said parsing comprises matching product producer names and product producer product identifiers from said categorized data elements to product producer names and product producer product identifiers from said stored product data.

3. The method according to claim 1, wherein said parsing comprises matching product SKUs from said categorized data elements to product SKUs in said stored product data.

4. The method according to claim 1, wherein said at least one of said suppliers comprise at least one of canonical suppliers.

5. The method of claim 1, further comprising indexing said stored product data and forwarding said indexed stored product data to at least one searchable database.

6. The method of claim 5, wherein said at least one searchable database has at least one mirrored database.

7. The method of claim 5, wherein said indexed stored product data comprises index meta-data and indexed data.

8. The method of claim 5, wherein said at least one searchable database is load balanced with at least one mirrored database.

9. The method of claim 1, further comprising updating at least one priced products database with said stored product data.

10. The method of claim 1 further comprising examining said buffer table and determining that at least one entry in said buffer table contains product data which may be entered with said stored product data.

11. The method of claim 10, further comprising categorizing said at least one entry.

12. The method of claim 1, further comprising parsing said product feed according to data types to determine, by said host computer, whether a second portion of said product feed may not be added to said stored product data within a database; and adding said second portion to said buffer table.

13. The method of claim 12, wherein said data types includes at least one of product description, price, merchant information, manufacturer information, and image.

* * * * *